(12) United States Patent
Uffenkamp et al.

(10) Patent No.: US 7,535,558 B2
(45) Date of Patent: May 19, 2009

(54) METHOD FOR OPTICAL CHASSIS MEASUREMENT

(75) Inventors: Volker Uffenkamp, Ludwigsburg (DE); Guenter Nobis, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/909,533

(22) PCT Filed: Nov. 16, 2006

(86) PCT No.: PCT/EP2006/068540
§ 371 (c)(1),
(2), (4) Date: Sep. 24, 2007

(87) PCT Pub. No.: WO2007/080012
PCT Pub. Date: Jul. 19, 2007

(65) Prior Publication Data
US 2008/0174789 A1    Jul. 24, 2008

(30) Foreign Application Priority Data
Dec. 29, 2005   (DE) ................ 10 2005 063 082

(51) Int. Cl.
*G01B 11/26* (2006.01)
(52) U.S. Cl. .................. 356/138; 356/139.09
(58) Field of Classification Search ............. 356/138, 356/139.09, 155
See application file for complete search history.

(56) References Cited
U.S. PATENT DOCUMENTS

| | | | | |
|---|---|---|---|---|
| 4,745,469 A | * | 5/1988 | Waldecker et al. | ............ 348/94 |
| 4,798,964 A | * | 1/1989 | Schmalfuss et al. | .... 250/559.22 |
| 5,532,816 A | * | 7/1996 | Spann et al. | ........... 356/139.09 |
| 5,619,587 A | * | 4/1997 | Willoughby et al. | ........ 382/141 |
| 6,397,164 B1 | | 5/2002 | Nobis et al. | |
| 6,404,486 B1 | | 6/2002 | Nobis et al. | |
| 7,230,694 B2 | | 6/2007 | Forster et al. | |
| 2005/0030525 A1 | | 2/2005 | Forster et al. | |

FOREIGN PATENT DOCUMENTS

| | | |
|---|---|---|
| DE | 197 57 760 | 7/1999 |
| DE | 197 57 763 | 7/1999 |
| EP | 1 505 367 | 2/2005 |
| FR | 2 808 082 | 10/2001 |
| WO | 99/34167 | 7/1999 |

\* cited by examiner

*Primary Examiner*—Roy Punnoose
(74) *Attorney, Agent, or Firm*—Michael J. Striker

(57) ABSTRACT

The invention relates to a method for optically measuring a chassis at a testing station. According to said method, radiation that is reflected by a surface structure of a vehicle, comprising at least one wheel (5) and a surrounding bodywork section, is detected by a measuring device with the aid of appropriate sensors, and at least the wheel plane and the wheel center point are determined by an evaluation of the positional data obtained by means of the detected radiation. To achieve a reliable, precise measurement of the chassis in a simple operation, the surface structure of at least the vehicle bodywork section and at least the wheel is scanned, over its entire surface or at least by any two lines that record both the wheel and the bodywork, using a laser beam (12) that is emitted by the measuring device (10), and at least two surface profiles are obtained from the scanned surface structure as characteristic structures.

5 Claims, 2 Drawing Sheets

METHOD FOR OPTICAL CHASSIS MEASUREMENT

CROSS-REFERENCE TO RELATED APPLICATION

The invention described and claimed herein below is also described in German Patent Application DE 10 2005 063 082.0 filed on Dec. 29, 2005. This German Patent Application, whose subject matter is incorporated here by reference, provides the basis for a claim of priority of invention under 35U.S.C. 119(a)-(d).

BACKGROUND OF THE INVENTION

The invention relates to a method for optical chassis measurement at a testing station, in which radiation reflected against a surface structure of a vehicle, including at least one wheel and a chassis opening surrounding it, is detected by a measuring device by means of a corresponding sensor system and, through evaluation of position data acquired from the detected radiation, at least the wheel plane and the wheel center point are determined.

A method for optical chassis measurement of this kind has been disclosed by DE 197 57 763 A1 and also in similar fashion by FP 1 042 643 B1. In these known methods, image capturing devices, in particular cameras, are used to detect reference features of the testing station as well as wheel features and chassis features and on the basis of this information, the axis of travel and geometrical data of the wheel and suspension are determined; according to DE 197 57 763 A1, the measurement is carried out while the vehicle is at rest and in the method according to EP 1 042 643 B1, the measurement is carried out while the vehicle is driven past the measuring device. In order to detect the features, ambient light in the region of the testing station is used; the features, in particular of the wheel and the chassis, can be affixed marks or other existing characteristic structures. It is also possible, however, for a special illumination to be provided on the measuring device, for example by means of LEDs; it is also possible for special retroreflecting measuring marks to be affixed to the wheel and the chassis. The prior publications cited also furnish further details regarding the type and detection of geometrical data of the wheel and suspension based on the geometrical information acquired by means of the marks and/or surface structures and they also mention additional patent applications based thereon. In practice, it has turned out that in order to obtain precise, reliable measurement results, it is useful to affix easily detectable marks; although these known systems have on the whole been able to considerably simplify the measurement in comparison to other systems of chassis measurement, adapting these marks to the wheel and chassis does in fact require a not insignificant amount of effort.

SUMMARY OF THE INVENTION

The object of the present invention is to provide a method for optical chassis measurement that can obtain the most precise, reliable measurement results possible, with the least amount of effort.

In the invention, the surface structure of at least the opening of the vehicle chassis and of at least the wheel is scanned over its area—or at least along any two lines that intersect both the wheel and the chassis—by means of a laser beam emitted by the measuring device and as characteristic structures, at least two surface profiles from the scanned surface structure are acquired, for example by establishing a three-dimensional aggregate of points. At points in which the profile lines intersect, for example, with the wheel rim edge or other rotationally symmetrical contours on the wheel and with the chassis opening, the spatial positions of characteristic surface points are determined as position data based on which the chassis data can be directly determined.

This makes it unnecessary to affix and adapt measurement marks to the vehicle wheel and chassis while the measurement device, based on existing surface structures and using the above-mentioned techniques, reliably and unambiguously acquires the surface points consulted for the measurement and subjects them to evaluation so as to obtain precise measurement results, particularly if powerful processors and computers, in connection with corresponding sensors are used for detecting surface structures.

The precision can be increased by increasing the number of surface profiles; by using corresponding algorithms, it is possible through averaging to compensate for a possibly reduced individual precision. The elimination of an adaptation of marks to the wheel and chassis significantly simplifies operation of the suspension measurement system among other things because the measurement involves no limitation with regard to the chassis material, no removal of hub caps, and no additional work for the adaptation.

The evaluation is made possible by the fact that the spatial position of surface points scanned for the detection of the surface structure is determined by means of polar coordinates, which are defined by the horizontal and vertical direction of the emitted laser beam (scanning direction) and by the distance between the surface point and the receiving sensor for the reflected laser beam of the measuring device in accordance with the nrincinle of a travel time measurement and/or phase difference measurement.

According to several embodiment variants, the laser beam is mechanically deflected for sequential scanning or the scanning is executed through the triggering of a stationary system (e.g. LCD matrix) in which the distance measurement is carried out for each matrix element.

The measurement is advantageously executed so that in order to determine the wheel plane, the wheel center point, and, where applicable, the chassis opening surrounding the wheel, a multitude of surface points in the form of a 3-D aggregate of points are consulted, but at least three points are consulted, at which two surface profiles intersect with the wheel rim edge, for example, or other rotationally symmetrical contours of the wheel, as well as with the wheel opening.

An important application lies in the fact that the load state of the wheel (wheel load) is determined based on the edge of the wheel opening, while track and camber are determined based on the wheel plane and the wheel center point.

Other advantages for the measurement arise from the fact that in the scanning, significant surface features on the wheel such as the valve, hole pattern, labeling, dirt, and/or a damaged region are detected and, based on these surface features, a wheel rim eccentricity is detected when the wheel is rotating (e.g. when rolling on the road surface) and taken into account in subsequent evaluation.

According to an advantageous measurement method, the measurement is carried out as the vehicle is driven past and travel direction data are acquired based on a detection of the movement direction of chassis surface structures.

The invention will be explained in greater detail below in conjunction with exemplary embodiments with reference to the drawings.

DESCRIPTION OF THE PREFERRED EMBODIMENTS

Figure 1:
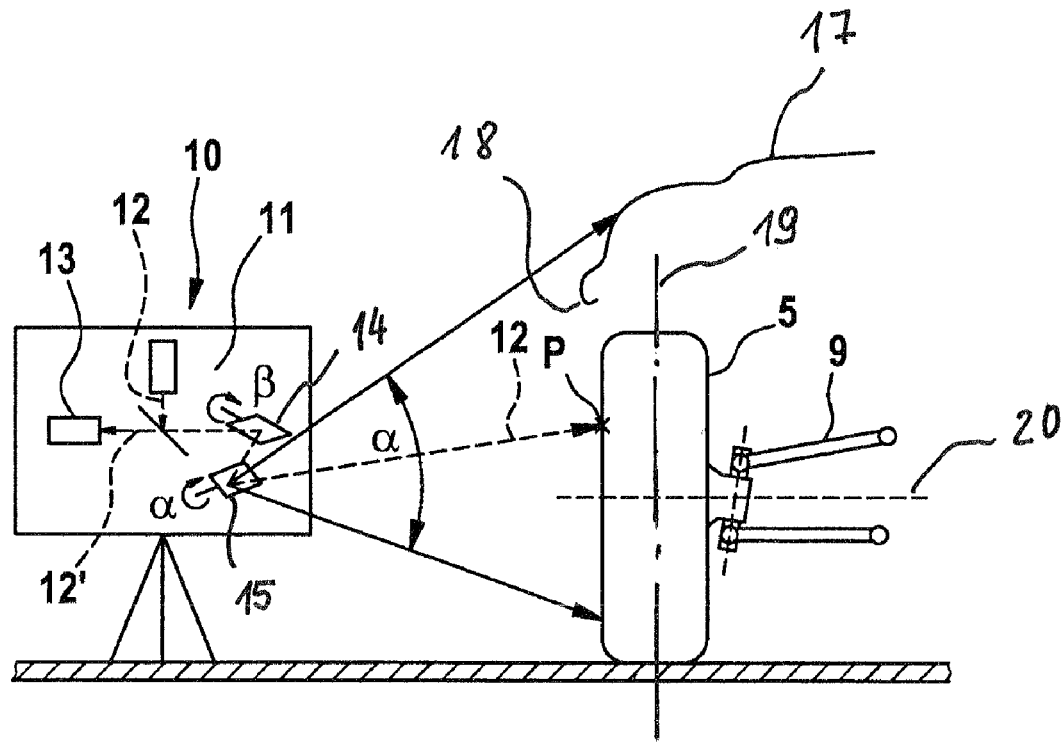
FIG. 1 is a schematic, partial depiction of a testing station viewed in the direction of travel, with a measuring device and a part of a vehicle to be measured
Figure 2A:
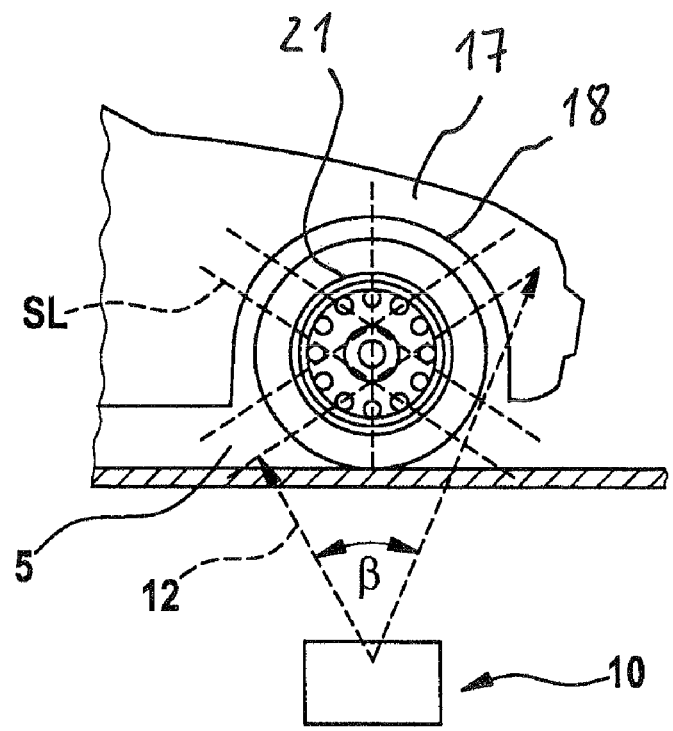
FIGS. 2A and 2B show a detail of the testing station according to FIG. 1, viewed from the side, with side lines (FIG. 2A) and profile lines (FIG. 2B) included in the drawing.
Figure 2B:
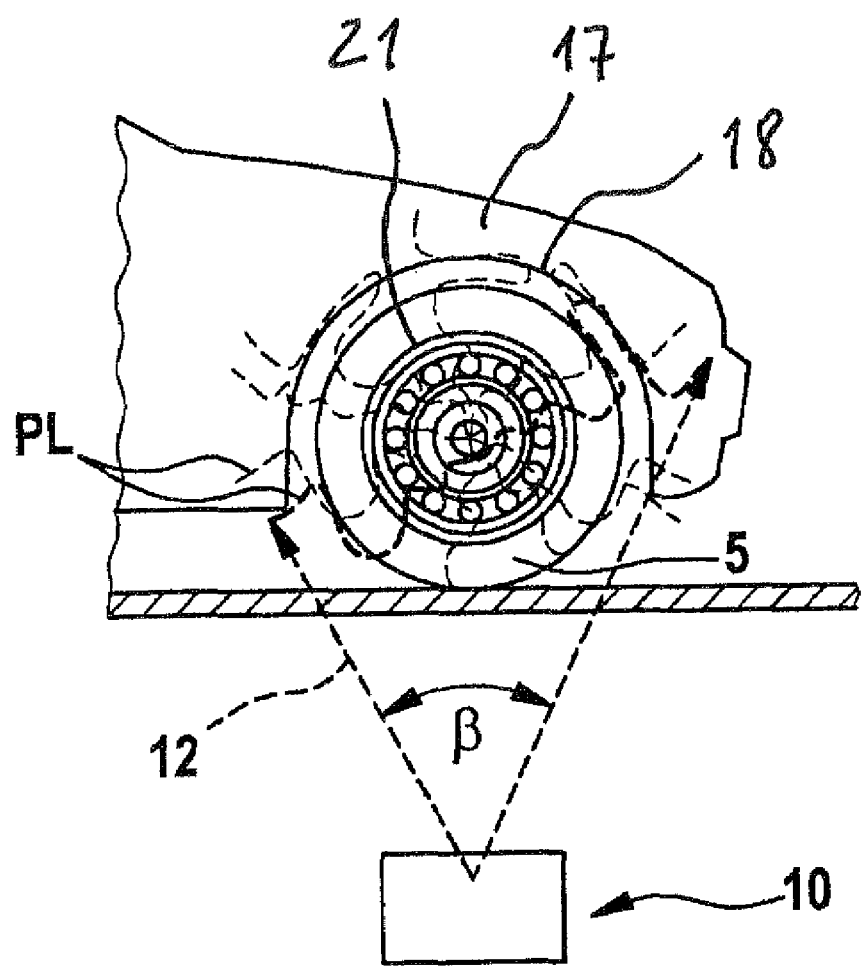

FIGS. 1, 2A, and 2B show a measuring instrument of a measuring device 10 situated to the side of a vehicle, in the region of a wheel 5. The measuring instrument includes a laser scanner 11, which emits a measurement beam 12 at defined deflection angles α, β, and a sensor system 13, which detects the reflected measurement beam 12' as well as its travel time and phase difference. The measurement instrument is also connected to computers whose computing power is appropriate to the complexity of the measurement. The measuring device 10 is able to determine a variety of data, particularly with regard to a wheel suspension 9.

The measuring instrument scans surface points P by tilting and panning the laser beam or measurement beam 12 in accordance with a horizontal angle β and a vertical angle α and determines the distance between the measuring instrument and the surface points P that yield the related surface structure. Based on intersecting lines SL of the scanning laser beam, the sensor system 13 and the connected evaluation devices of the measuring instrument generate profile lines PL.

For three-dimensional position determination of the surface points using this laser scanner, the principle of determining spatial polar coordinates is used, which is known from the field of surveying. The polar coordinates of a surface point are established based on two directions (horizontal and vertical) and the distance between the measuring instrument and the surface point. In order to detect the surface structure in question, the measuring instrument emits the laser beam or measuring beam 12 that the surface structure reflects back to a receiver of the sensor system 13. The distance from the surface point is calculated based on a travel time measurement and/or phase difference measurement. The beam-guiding components 14, 15 of the measuring instrument 10 rotate around a horizontal and vertical axis so that the surface structure is three-dimensionally scanned in sequential fashion. The sum of the surface points P establishes a 3-D aggregate of points that represents the surface of the section of the vehicle detected.

Various methods can be used, namely moving systems, for example with mechanical deflection of the beam, or stationary systems, for example with an LCD matrix in which the distance measurement is carried out for each matrix element.

Each vehicle wheel, based on its components such as the tire, wheel rim, hub cap, and valve or the like, has a 3-D surface structure that can be used to measure the wheel and suspension geometry while each wheel well contour, particularly in the region of the wheel opening, has characteristic features from which is possible to deduce the load state for the respective wheel.

The detection of at least two surface profiles (profile lines PL) out of the surface structure makes it possible to determine the wheel geometry if the two profiles intersect at least three times with the wheel rim, for example. With a low number of surface profiles, it is advantageous if the sections extend as perpendicularly as possible in relation to the edge of the wheel rim. For example based on the at least three wheel rim edge points, it is possible to calculate the wheel plane and the wheel center point. These data can be used to obtain the track and camber and, if so desired, other data of interest relating to the geometry of the wheel and suspension.

It is possible to detect significant surface features of the wheel such as the valve, hole pattern, labeling, or other features such as dirt and damage. This makes it possible for a potential wheel rim eccentricity to be detected when the wheel is rotating (e.g. when rolling on the road surface) and taken into account in the evaluation.

If a measurement is executed as the vehicle is driven past, then it is necessary to determine the movement of the chassis relative to the measuring device. Prominent chassis structures on the movement path are used to determine the direction or axis of travel of the moving vehicle.

As a rule, a larger object section including part of the chassis and the wheel is detected at the beginning of a measurement. To reduce the required complexity of the measurement, it is possible to adapt the size of the object section to different vehicle types and rim sizes after the locations of the object structures of interest have been pinpointed.

What is claimed is:

1. A method for optical chassis measurement at a testing station, in which radiation reflected from a surface structure of at least one wheel and a chassis opening surrounding a vehicle, is detected by a measuring device by means of a corresponding sensor system and, through evaluation of position data acquired from the detected radiation, at least the wheel plane and the wheel center point are determined, wherein the surface structure of at least one opening of the chassis and of at least the wheel is scanned over its area by a laser beam emitted by the measuring device and as characteristic structures, at least two surface profiles from the scanned surface structure of surface points are acquired, wherein the spatial position of surface points scanned for the detection of the surface structure is determined by spatial polar coordinates, which are defined by the horizontal and vertical direction of the emitted laser beam and by the distance between the surface point and the receiving sensor for the reflected laser beam of the measuring device in accordance with the principle of a travel time measurement and/or chase difference measurement, and wherein the load state of the wheel is determined based on the edge of the wheel opening, while the track and camber are determined based on the wheel plane and wheel center point.

2. The method as recited in claim 1, wherein the laser beam is mechanically deflected for sequential scanning or the scanning is executed through the triggering of a stationary system.

3. The method as recited in claim 1, wherein in order to determine the wheel plane, the wheel center point, and, where applicable, the chassis opening surrounding the wheel, a multitude of surface points in the form of a 3-D aggregate of points are consulted.

4. The method as recited in claim 1, wherein in the scanning, significant surface features on the wheel and/or a damaged region are detected and based on these surface features, a wheel rim eccentricity is detected while the wheel is rotating and taken into account in subsequent evaluation.

5. The method as recited in claim 1, wherein the measurement is carried out as the vehicle is driven past and travel direction data are acquired based on a detection of the movement direction of chassis surface structures.

* * * * *